United States Patent [19]

Rotenberg et al.

[11] 4,186,026

[45] Jan. 29, 1980

[54] ABRASION-RESISTANT COATING COMPOSITION

[75] Inventors: Don H. Rotenberg, Westboro; Patricia M. Cuffe, Dudley; Bernard L. Laurin, Ludlow, all of Mass.

[73] Assignee: American Optical Corporation, Southbridge, Mass.

[21] Appl. No.: 956,008

[22] Filed: Oct. 30, 1978

[51] Int. Cl.$^2$ ............................................. C09K 3/00
[52] U.S. Cl. ........................ 106/287.14; 106/287.16; 428/412
[58] Field of Search ................. 106/287.14, 287.16; 428/412

[56] References Cited

U.S. PATENT DOCUMENTS

| | | | |
|---|---|---|---|
| 3,894,881 | 7/1975 | Suzuki et al. | 106/287.14 |
| 4,064,308 | 12/1977 | Laurin | 428/410 |

*Primary Examiner*—Theodore Morris
*Attorney, Agent, or Firm*—Jeremiah J. Duggan; Alan H. Spencer; Stephen A. Schneeberger

[57] ABSTRACT

A coating composition prepared by simultaneously hydrolyzing 20 to 50 wt. % tetraethylorthosilicate, 37 to 60 wt. % of certain silanes and 15 to 35 wt. % formalin has good abrasion resistance and resistance to crazing on substrates having a high affinity for water as well as those with a low affinity for water.

5 Claims, No Drawings

ABRASION-RESISTANT COATING COMPOSITION

BACKGROUND OF THE INVENTION

This invention relates to abrasion-resistant coating compositions and more particularly to abrasion-resistant coating compositions having good resistance to crazing on both substrates which have a high affinity for water as well as those which have a low affinity for water.

PRIOR ART

U.S. Pat. No. 3,894,881 issued July 15, 1975 to Suzuki et al. and discloses a coating composition of separately hydrolyzed Si containing materials that are later combined and then cured on a substrate. The material also contains a metal salt as a catalyst.

U.S. Pat. No. 4,064,308 issued Dec. 20, 1977 to Laurin relates to an abrasion-resistant, anti-fog coating of polyvinyl alcohol crosslinked by a mixture of zirconium nitrate and formaldehyde.

BRIEF DESCRIPTION OF THE PRESENT INVENTION

SUMMARY OF THE INVENTION

We have developed an improved type of abrasion-resistant coating which exhibits superior resistance to crazing on water-absorbent substrates. Water-absorbent substrates include materials such as poly(diethylene glycol bisallyl carbonate), cellulose propionate and cellulose acetate butyrate, which are preferred materials for lenses such as ophthalmic lenses. Other conventional lens materials such as ordinary polycarbonate resins or polymethylmethacrylate do not absorb sufficient water to create crazing problems under normal environmental conditions. However, materials having a high affinity for water, such as those mentioned above, exhibit dimensional changes with changes in humidity. These dimensional changes have heretofore resulted in crazing of the abrasion-resistant coating which we have overcome by using a simultaneously hydrolyzed mixture of tetraethylorthosilicate, certain silanes and formaldehyde. The formaldehyde increases the flexibility of the coating enabling it to withstand cycle-humidity testing. While the principal advantage of the present invention is an abrasion-resistant coating capable of withstanding dimensional changes when applied to a water-absorbent substrate, the coating is also useful with substrates that do not have a high affinity for water. The compositions of the present invention comprise 20 to 50 wt. % tetraethylorthosilicate, 37 to 60 wt. % of a silane selected from methyltrimethoxysilane, dimethyldimethoxysilane, ethyltriethoxysilane, diethyldiethoxysilane, ethyltrimethoxysilane and methyltriethoxysilane, and 15 to 35 wt. % formalin (37% formaldehyde).

EXAMPLE 1

A solution of 256.7 grams of tetraethylorthosilicate, 513.5 grams of methyltrimethoxysilane and 256.7 grams of formalin (37% formaldehyde) was vigorously agitated while a solution of 136.9 grams of water, 68.5 grams of acetic acid and 308.1 grams of a 50/50 mixture of isopropyl and n-butyl alcohols was slowly added through a dropping funnel to avoid raising the temperature beyond 90° F. by the exothermic reaction. After the aqueous alcohol-acid solution had been added, the reaction mixture was covered and aged about five days.

Ten CR-39® [poly(diethylene glycol bisallyl carbonate)] lenses were hydrolyzed and dipped in the solution and withdrawn at a rate of ten inches per minute. The coated lenses were cured in a circulating air oven at a temperature of 220° F. for eight hours. All ten lenses passed three cycles of a humidity test consisting of holding the lenses for eight hours at a temperature of 160° F. with 95% relative humidity and then 16 hours at room temperature and humidity.

EXAMPLE 2

Eight CR-39® lenses were hydrolyzed and dip coated in an abrasion-resistant coating obtained from Dow-Corning identified by the code number Q6312 and covered by U.S. Pat. No. 3,986,997 using the procedure described in the noted patent and cured. These eight lenses were subjected to the cycle-humidity test described above and all eight failed after the second cycle.

EXAMPLE 3

The procedure for making the coating material of Example 1 was repeated except the amount of tetraethylorthosilicate was modified to provide 33 wt. % and the amount of methyltrimethoxysilane was modified to provide 42 wt. %. The amount of formalin remained at 25%. Polycarbonate lenses coated with the material after it was aged for about five days exhibited no crazing after three cycles of the humidity test.

What is claimed is:

1. A coating composition consisting of the hydrolysis product of
   A. 20 to 50 wt. % tetraethylorthosilicate,
   B. 37 to 60 wt. % of a silane selected from the group consisting of methyltrimethoxysilane, dimethyldimethoxysilane, ethyltriethoxysilane, diethyldiethoxysilane, ethyltrimethoxysilane and methyltriethoxysilane, and
   C. 15 to 35 wt. % formalin.

2. The coating composition of claim 1 for substrates of relatively high affinity for water, wherein A is about 25 wt. %, B is about 50 wt. % and C is about 25 wt. %.

3. The coating composition of claim 1 for substrates of relatively low affinity for water wherein A is about 33 wt. %, B is about 42 wt. % and C is about 25 wt. %.

4. The coating composition of claim 2 wherein B is methyltrimethoxysilane.

5. The coating composition of claim 3 wherein B is methyltrimethoxysilane.